United States Patent
Hao et al.

(10) Patent No.: US 8,595,141 B2
(45) Date of Patent: Nov. 26, 2013

(54) DELIVERING VIDEO ON DEMAND (VOD) USING MOBILE MULTICAST NETWORKS

(75) Inventors: Jack Jianxiu Hao, Lexington, MA (US);
John F. Gallagher, Hopewell, NJ (US);
Raul Aldrey, Plano, TX (US); Ruchir Rodrigues, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 65 days.

(21) Appl. No.: 13/296,521

(22) Filed: Nov. 15, 2011

(65) Prior Publication Data
US 2013/0125175 A1    May 16, 2013

(51) Int. Cl.
*G06Q 99/00*    (2006.01)

(52) U.S. Cl.
USPC .............................. 705/59; 725/62

(58) Field of Classification Search
USPC ............................. 705/59; 725/62
See application file for complete search history.

(56) References Cited

U.S. PATENT DOCUMENTS

| | | | | |
|---|---|---|---|---|
| 7,526,788 B2* | 4/2009 | Rodriguez | | 725/86 |
| 8,006,273 B2* | 8/2011 | Rodriguez | | 725/86 |
| 8,219,134 B2* | 7/2012 | Maharajh et al. | | 455/519 |
| 8,248,931 B2* | 8/2012 | Klein et al. | | 370/230 |
| 2003/0005452 A1* | 1/2003 | Rodriguez | | 725/86 |
| 2008/0207137 A1* | 8/2008 | Maharajh et al. | | 455/74 |
| 2008/0281968 A1* | 11/2008 | Rodriguez | | 709/226 |
| 2009/0249412 A1* | 10/2009 | Bhogal et al. | | 725/104 |
| 2009/0254481 A1* | 10/2009 | Lee et al. | | 705/51 |
| 2010/0037248 A1* | 2/2010 | Lo et al. | | 725/1 |
| 2010/0146553 A1* | 6/2010 | Lo et al. | | 725/54 |
| 2011/0179453 A1* | 7/2011 | Poniatowski | | 725/58 |

* cited by examiner

*Primary Examiner* — James D Nigh

(57) ABSTRACT

A system and method are provided for obtaining video content using wireless multicast for video content data in combination with wireless unicast for requests of the video content and transmissions of licenses to use the video content. A method can include: receiving an instruction to obtain particular content; sending a first wireless unicast signal requesting the particular content; receiving the obtained particular content in response to sending the first wireless unicast signal; obtaining a license for the particular content; and providing a notification that the particular content is available for display by a mobile device.

20 Claims, 20 Drawing Sheets

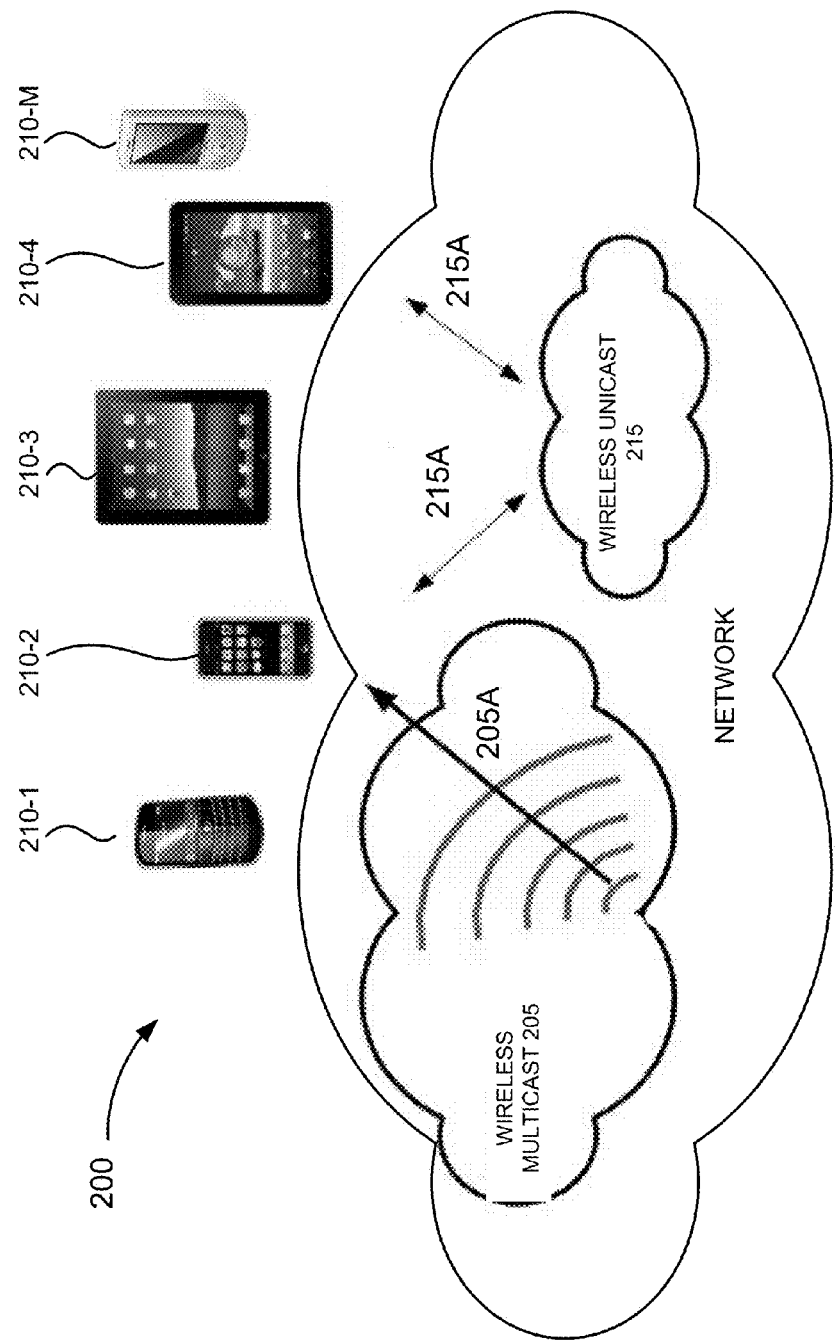

DELIVERING VIDEO ON DEMAND (VOD) USING MOBILE MULTICAST NETWORKS

BACKGROUND

Content providers, such as wireless telephone service providers, permit users to obtain media content, such as video content and/or audio content, on their mobile devices. Streaming and download processes can sometimes be cumbersome on the mobile network, and wireless bandwidth is getting more and more precious as the demand for video content grows.

BRIEF DESCRIPTION OF THE DRAWINGS

FIG. 2A is a diagram that illustrates an example environment in which systems and/or methods, described herein, may be implemented;

DETAILED DESCRIPTION OF PREFERRED EMBODIMENTS

The following detailed description refers to the accompanying drawings. The same reference numbers in different drawings may identify the same or similar elements.

Figure 1:
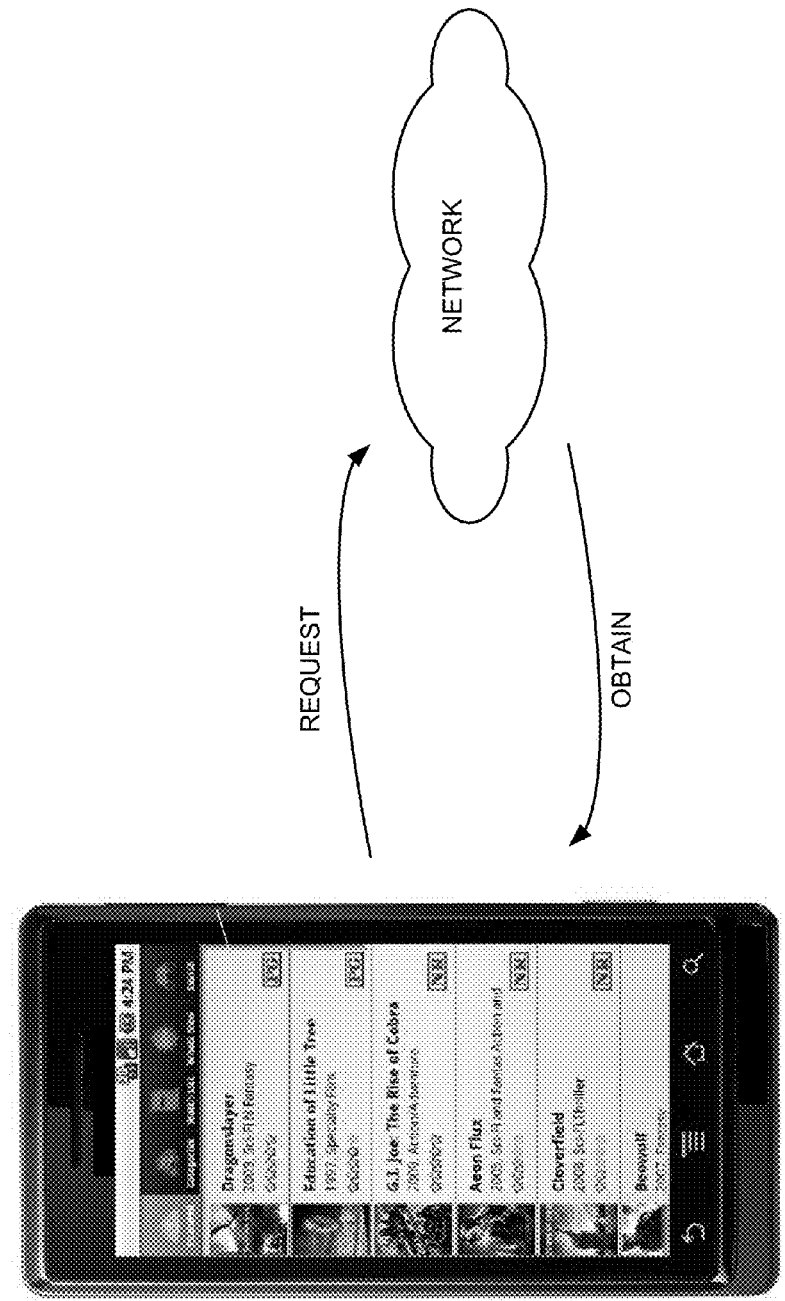
FIG. 1 is a diagram of an overview of an implementation described herein.

FIG. 1 is a diagram of an overview of an implementation described herein. As shown in FIG. 1, a user of a mobile device may use the mobile device to request and obtain content from a network. As wireless bandwidth demand continues to increase as the demand for content through wireless viewing increases, network congestion can occur. An implementation, which can potentially reduce network congestion, uses multicast for transmitting content using one data channel to serve many mobile devices simultaneously. Multicast, when used in combination with unicast, can potentially allow for user requested content, such as video on demand, to be distributed by multicast. In one implementation, a user can request content through unicast, and can obtain content through multicast, which can thus allow content to be specifically on demand through the unicast, while also being efficient with broadband usage through multicast.

The description to follow will describe the content as video content, such as television content, movie content, gaming content, or the like. The term "video content," as used herein, is intended to include video data, which may or may not be combined with audio data. While the description will focus on video content, the description is not so limited and may apply to other types of content, such as audio content (e.g., audio books, music, concerts, etc.).

FIG. 2A is a diagram that illustrates an example environment 200 in which systems and/or methods, described herein, may be implemented. As shown in FIG. 2A, environment 200 may include a network with: wireless multicast system 205 that sends multicast signals (i.e., multicast data packets) 205A; and wireless unicast system 215 that sends unicast signals (i.e., unicast data packets) 215A. The network can communicate to mobile devices 210-1, 210-2, 210-3, 210-4, ..., 210-M (where M≥1) (collectively referred to as "mobile devices 210," and individually as "mobile device 210") via multicast signals 205A and unicast signals 215A.

A network in the above implementation may generally include logic to provide wireless access for mobile devices 210. Through this network, mobile devices 210 may, for instance, communicate with one another (e.g., via a voice call), access services through IP network, and/or complete telephone calls through a traditional telephone network, such as a public switched telephone network (PSTN). The network may be a network that provides a wireless (radio) interface to mobile devices 210 using the $3^{rd}$ generation (3G) mobile telecommunications standards. An implementation of 3G network may include one or more elements through which mobile devices 210 may wirelessly connect to receive telecommunication services. The network may be a network that provides a wireless (radio) interface to mobile devices 210 using the $4^{th}$ generation (4G) mobile telecommunications standards. An implementation of 4G network may include one or more elements through which mobile devices 210 may wirelessly connect to receive telecommunication services. 4G networks can include a radio access network (e.g., a long term evolution (LTE) network or an enhanced high rate packet data (eHRPD) network) and a wireless core network (e.g., referred to as an evolved packet core (EPC) network). An LTE network is often called an evolved universal terrestrial radio access network (E-UTRAN). An EPC network can be an all-IP packet-switched core network that supports high-speed wireless and wireline broadband access technologies. An evolved packet system (EPS) is defined to include the LTE (or eHRPD) network and the EPC network.

Wireless multicast system 205, which may traverse the network, may include point-to-multipoint (PTM) multicast, where transmissions of multicast signals 205A takes place instantaneously from a single source (e.g., within the network) to multiple endpoints (e.g., mobile devices 210). Wireless multicast system 205 may be used to transmit video content in an efficient manner by using a single multicast channel 205A to reach multiple mobile devices 210 simultaneously.

Wireless unicast system 215, which may also traverse the network, may include point-to-point transmissions of unicast signals 215A from the network to mobile device 210 or from mobile device 210 to the network. Wireless unicast signals 215A may be transmitted to allow for information to be transmitted to and from two single points (e.g., from the network to mobile device 210, and from mobile device 210 to the network).

Wireless multicast system 205 differs from broadcasts in that wireless multicast signals 205A are sent from one point to a set of many points, while broadcasts are sent from one point to all points. For example, wireless multicast system 205 utilizes multicast routers which send internet group membership protocol (IGMP) query packets to a special address and hosts, which want to receive multicast traffic, reply and join the multicast. On the other hand, broadcasts send packets indiscriminately to every port in a broadcast domain. Unlike broadcasts, wireless multicasts 205 data is received by clients who have previously elected to receive the data. For example, a user of a mobile device 210 can activate an application, which can allow mobile device 210 to join a multicast and receive multicast data.

Wireless unicast system 215 differs from wireless multicast systems 205 in that unicast signals 215A can be two-directional (from one point to a second point and vice versa), while on the other hand, wireless multicast signals 205A send signals from one point to multiple points in one direction (similar to broadcast signals).

While the example wireless multicast system 205 and wireless unicast system 215 discussed herein may be provided over a cellular network, other networks may be used, such as a local area network (LAN), a wide area network (WAN) (e.g., the Internet), a metropolitan area network (MAN), an ad hoc network, a telephone network (e.g., a Public Switched Telephone Network (PSTN), or a voice-over-IP (VoIP) network), or a combination of networks. In one implementation, mobile device 210 may stream or download video content via a wireless LAN (WLAN) (e.g., Wi-Fi (wireless fidelity)), a wireless WAN (WWAN) (e.g., EVDO (evolution data optimized)), sideloading (i.e., a transfer between two local devices), or a cable (e.g., USB).

Mobile device 210 may include any portable device capable of communicating via a network. For example, mobile device 210 may correspond to a mobile communication device (e.g., a mobile phone or a personal digital assistant (PDA)), a portable computer device (e.g., a laptop or a tablet computer), or another type of portable device.

Figure 2B:
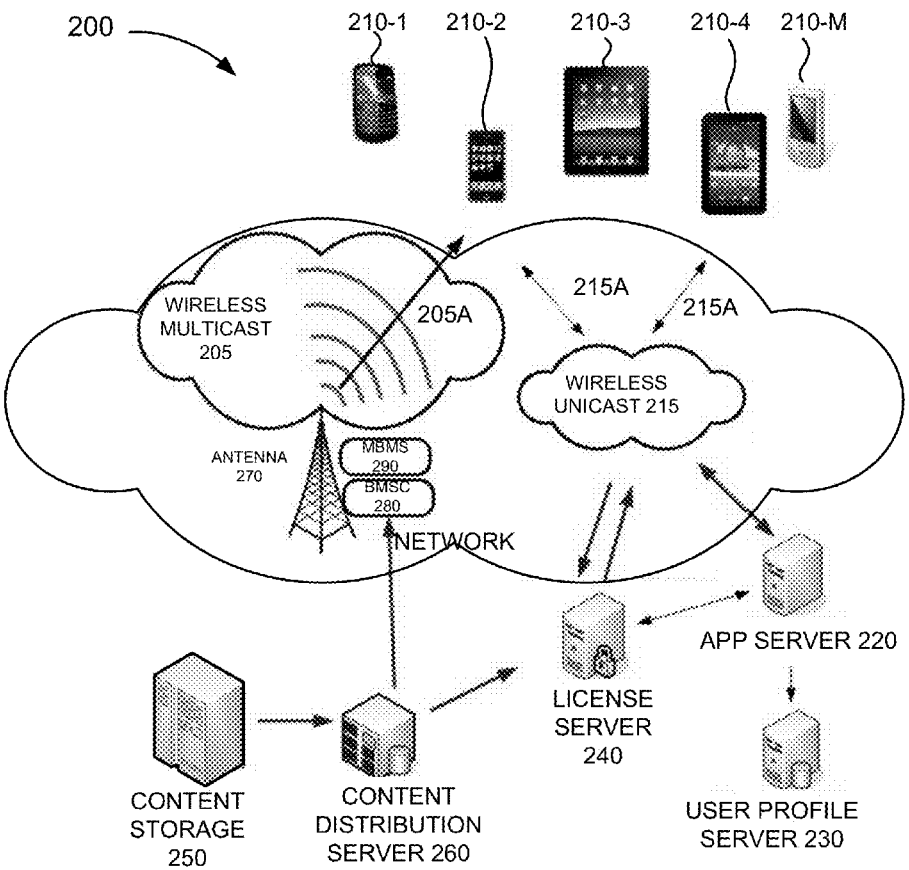
FIG. 2B is a diagram that illustrates an example environment in which systems and/or methods, described herein, may be implemented.

FIG. 2B is a diagram that illustrates the example environment 200 with an application server 220 (hereinafter referred to as "app server 220"), a user profile server 230, a license server 240, a content storage server 250, a content distribution server 260, an antenna 270, a broadcast multicast service center (BMSC) 280, and a multimedia broadcast multicast service (MBMS) 290. While FIG. 2B shows a particular number and arrangement of devices, in practice, environment 200 may include additional, fewer, different, or differently arranged devices than are shown in FIG. 2B. For example, each of servers 220-260 may be implemented as multiple, possibly distributed, devices. Alternatively, two or more of servers 220-260 may be implemented within a single device.

App server 220 is a backend support system, for a mobile application, that can support user authentication, and billing entitlement, as well as search and browse features of content catalogs. App server 220 may include a server device, such as a computer device, that provides a video content application or performs user authentication, content listing management, or order processing. For example, app server 220 may permit mobile device 210 to stream or download a video content application that may permit a user to find video content of interest or play downloaded or streaming video content. Additionally, or alternatively, app server 220 may provide video content metadata, such as lists or categories of video content. Additionally, or alternatively, app server 220 may authenticate a user who desires to purchase, rent, or subscribe to video content. In one implementation, the interactions between app server 220 and mobile device 210 may be performed using the hypertext transfer protocol (HTTP) or the secure HTTP (HTTPS). In another implementation, the interactions between app server 220 and mobile device 210 may be performed using another type of protocol.

User profile server 230 may include a server device, such as a computer device, to store user profile information for users. The user profile information may include various information regarding a user, such as login information (e.g., user identifier and password), billing information, address information, types of services or content to which the user has subscribed, a list of video content purchased by the user, a list of video content rented by the user, ratings of video content by the user, a device identifier (e.g., a mobile device identifier, a set top box identifier, a personal computer identifier) for devices used by the user, a video content application identifier associated with the video content application obtained from app server 220, or the like. App server 220 may use the user profile information to authenticate a user and may update the user profile information based on the user's activity (with the user's express permission).

License server 240 may be used to validate, enforce, and issue Digital Rights Management (DRM) licenses. The license server 240 may include a server device, such as a computer device, that provides key and license management. For example, license server 240 may receive a request from a mobile device 210 for a license relating to video content that mobile device 210 is streaming or has downloaded. The license may include information regarding the type of use permitted by mobile device 210 (e.g., a purchase, a rental, or a subscription) and a decryption key that permits mobile device 210 to decrypt the video content. In one implementation, the communication between license server 240 and mobile device 210 may be conducted over a secure channel, may include public and private keys, or may include other forms of secure communication.

Content storage server 250 may include a server device, such as a computer device, or a storage device, such as a database, that stores or processes video content. For example, content storage server 250 may perform encoding operations on video content using, for example, public/private keys. Content storage server 250 may also perform transcoding operations on the video content. Content storage server 250 may store video content in encrypted form.

Content distribution server 260 may include a server device, such as a computer device, that delivers video content to mobile devices 210. For example, content distribution server 260 may permit a mobile device 210 to stream or download particular video content once the user, of mobile device 210, has been properly authenticated. The content distribution server 260 can transcode content into different formats for various mobile devices 210 to be able to play, and can also encrypt data using DRM technology to enforce digital rights licenses.

Content distribution server 260 may deliver content from content storage server 250 for use with a Video On Demand Service, or may deliver content from any other content source accessible to content distribution server 260. For example, the content distribution server 260 can distribute content from sources, such as a home-based DVR, a live television broadcast, internet portals, etc.

Antenna 270 may be any type of antenna that converts electric currents into radio waves, and radio waves into electric currents for transmitting and receiving, respectively. Antenna 270 may include several antenna elements that can be used individually or combined to synthesize several overlapping antenna beams spanning three-hundred and sixty (360) degrees in azimuth. For example, antenna 270 may include between four and eight antenna elements to achieve desirable antenna gains.

BMSC 280 may be used as an entry point for video content to be delivered to MBMS 290 for transmission to one or more mobile devices 210. BMSC 280 may include a server device, such as a computer device, that includes accounting features similar to an accounting server, and can be used to control the distribution of media to users of wireless multicast system 205 or wireless unicast system 215. For example, BMSC 280 can control the number of data channels assigned to a video content for multicast signals 205A and unicast signals 215A, as well as download capabilities.

MBMS 290 may be an interface gateway between a wireless network and a multicast network for data delivery management and session control. For example, in multicast, MBMS 290 may allow one multicast data channel to be connected to all capable mobile devices 210 associated with a cell site.

Figure 3:
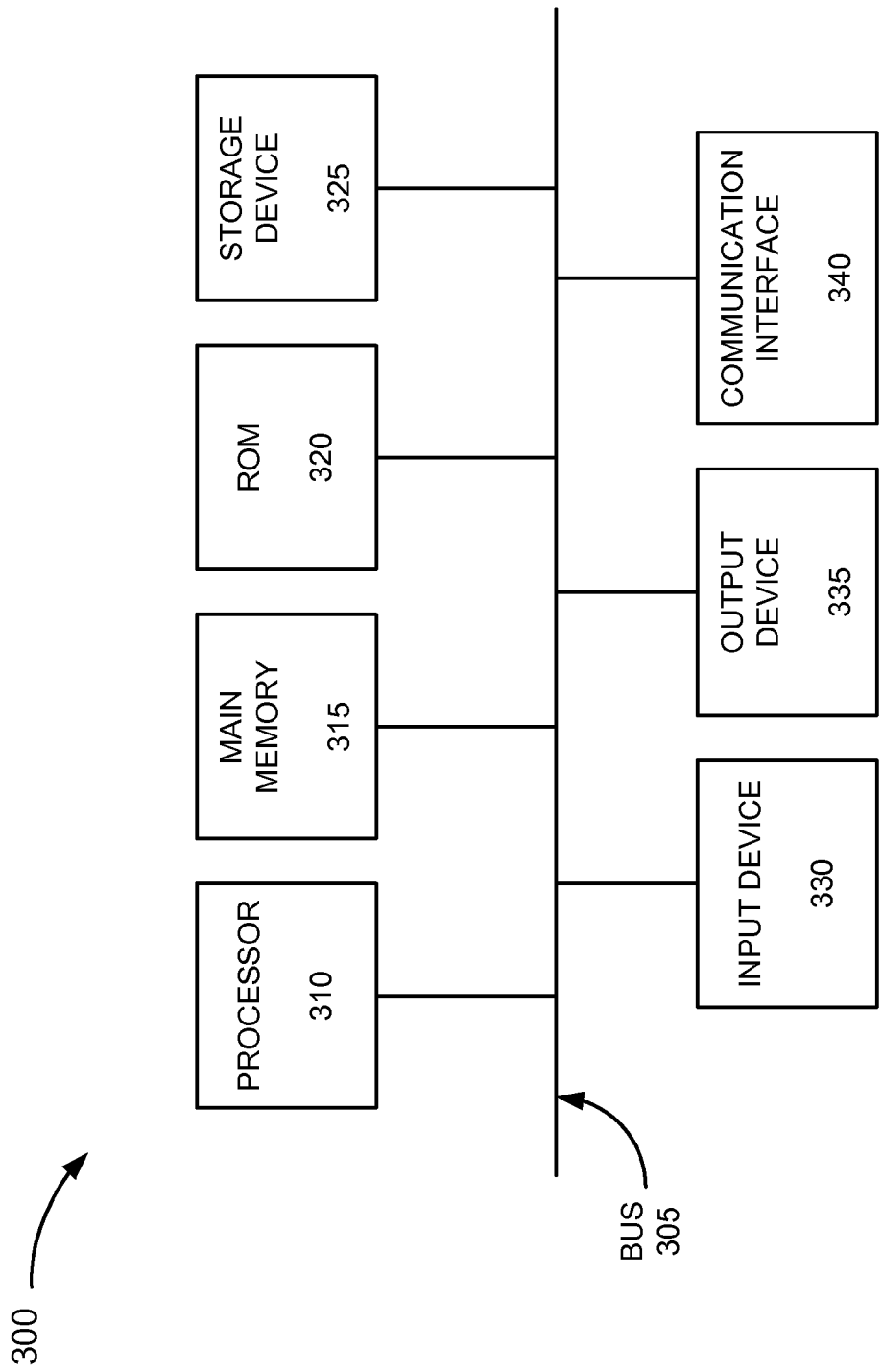
FIG. 3 is a diagram of example components of a device that may be used within the environment of FIGS. 2A and 2B.

FIG. 3 is a diagram of example components of a device 300. Device 300 may correspond to app server 220, user profile server 230, license server 240, content storage server 250, or content distribution server 260. Each of app server 220, user profile server 230, license server 240, content storage server 250, and content distribution server 260 may include one or more devices 300.

As shown in FIG. 3, device 300 may include a bus 305, a processor 310, a main memory 315, a read only memory (ROM) 320, a storage device 325, an input device 330, an output device 335, and a communication interface 340. In another implementation, device 300 may include additional, fewer, different, or differently arranged components.

Bus 305 may include a path, or collection of paths, that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices (e.g., mobile devices 210) or networks. In one implementation, communication interface 340 may include a wireless interface, a wired interface, or an optical interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical memory device or spread across multiple physical memory devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
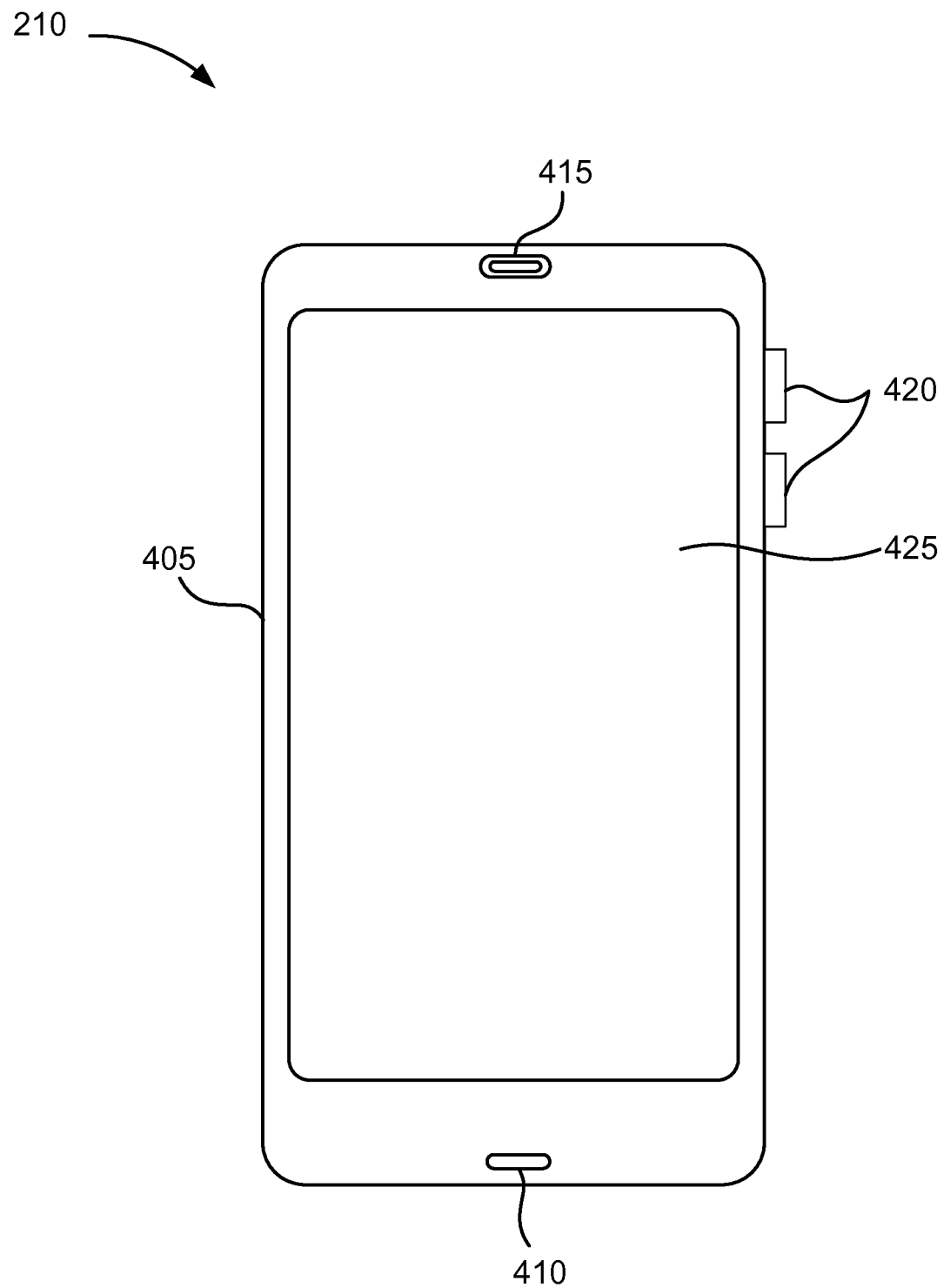
FIG. 4 is a diagram of an example mobile device of FIGS. 2A and 2B.

FIG. 4 is a diagram of an example implementation of mobile device 210. In the implementation shown in FIG. 4, mobile device 210 may correspond to a mobile communication device. Mobile device 210 may include a housing 405, a microphone 410, a speaker 415, buttons 420, and a display 425. In other implementations, mobile device 210 may include fewer, additional, different, or differently arranged components than those illustrated in FIG. 4 and described herein. For example, a keypad or other input device may be implemented on a touch screen of display 425 or on buttons 420.

Housing 405 may include a structure to contain components of mobile device 210. For example, housing 405 may be formed from plastic, metal, or some other material. Housing 405 may support microphone 410, speaker 415, buttons 420, and display 425.

Microphone 410 may include an input device that converts a sound wave to a corresponding electrical signal. For example, the user may speak into microphone 410 during a telephone call or to execute a voice command.

Speaker 415 may include an output device that converts an electrical signal to a corresponding sound wave. For example, the user may listen to music, listen to a calling party, or listen to other auditory signals through speaker 415.

Buttons 420 may include an input device that provides input into mobile device 210. Buttons 420 may include an input component to mobile device 210 to enter information, such as to access a camera feature, to access data, or to invoke a function or an operation. Buttons 420 can be implemented as physical keys on housing 405 or display 425, or virtual keys on a touch screen of display 425.

Display 425 may include an output device that outputs visual content, and/or may include an input device that receives user input (e.g., a touch screen (also known as a touch display)). Display 425 may be implemented according to a variety of display technologies, including but not limited to, a liquid crystal display (LCD), a plasma display panel (PDP), a field emission display (FED), a thin film transistor (TFT) display, a light emitting diode (LED) display, an organic light emitting diode (OLED) display, or some other type of display technology. Additionally, display 425 may be implemented according to a variety of sensing technologies, including but not limited to, capacitive sensing, surface acoustic wave sensing, resistive sensing, optical sensing, pressure sensing, infrared sensing, gesture sensing, etc. Display 425 may be implemented as a single-point input device (e.g., capable of sensing a single touch or point of contact) or a multipoint input device (e.g., capable of sensing multiple touches or points of contact that occur at substantially the same time).

Figure 5:
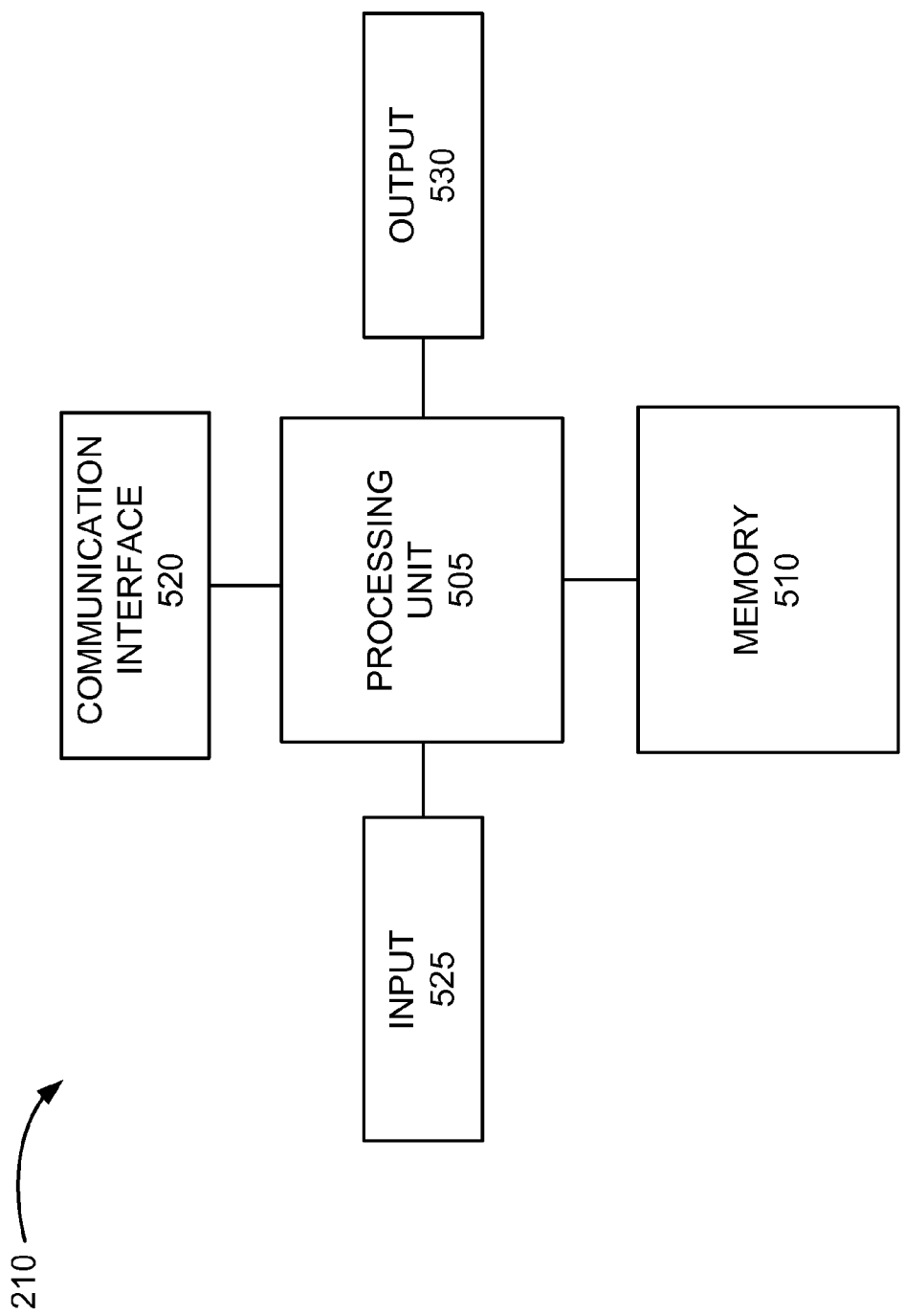
FIG. 5 is a diagram of example components of the mobile device of FIG. 4.

FIG. 5 is a diagram illustrating example components of mobile device 210. As illustrated, mobile device 210 may include a processing unit 505, a memory 510, a communication interface 520, an input component 525, and an output component 530. In another implementation, mobile device 210 may include fewer, additional, different, or differently arranged components than those illustrated in FIG. 5. Additionally, in other implementations, a function described as being performed by a particular component of mobile device 210 may be performed by a different component of mobile device 210.

Processing unit 505 may include one or more processors, microprocessors, data processors, co-processors, network processors, ASICs, controllers, programmable logic devices (PLDs), chipsets, FPGAs, or other components that may interpret or execute instructions or data. Processing unit 505 may control the overall operation, or a portion thereof, of mobile device 210, based on, for example, an operating system (not illustrated) and/or various applications. Processing unit 505 may access instructions from memory 510, from other components of mobile device 210, or from a source external to mobile device 210 (e.g., a network or another device).

Memory 510 may include memory or secondary storage. For example, memory 510 may include a RAM, a dynamic RAM (DRAM), a ROM, a programmable ROM (PROM), a flash memory, or some other type of memory. Memory 510 may include a hard disk (e.g., a magnetic disk, an optical disk, a magneto-optic disk, a solid state disk, etc.) or some other type of computer-readable medium, along with a corresponding drive. Memory 510 may store data, applications, or instructions related to the operation of mobile device 210. For example, memory 510 may include a variety of applications, such as a video content application, a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application, or other types of applications (e.g., a word processing application, a spreadsheet application, etc.). As described above, the video content application may permit a user to find video content of interest; purchase, rent, or subscribe to the video content; or play the video content.

Communication interface 520 may include a component that permits mobile device 210 to communicate with other devices (e.g., app server 220, license server 240, and/or content distribution server 260) or networks (e.g., wireless multicast system 205 or wireless unicast system 215). For example, communication interface 520 may include some type of wireless or wired interface. Communication interface 520 may also include an antenna (or a set of antennas) that permit wireless communication, such as the transmission and reception of radio frequency (RF) signals.

Input component 525 may include a component that permits a user or another device to input information into mobile device 210. For example, input component 525 may include a keypad, buttons (e.g., buttons 420), a switch, a knob, fingerprint recognition logic, retinal scan logic, a web cam, voice recognition logic, a touchpad, an input port, a microphone (e.g., microphone 410), a display (e.g., display 425), or some other type of input component. Output component 530 may include a component that permits mobile device 210 to output information to the user or another device. For example, output component 530 may include a display (e.g., display 425), LEDs, an output port, a speaker (e.g., speaker 415), or some other type of output component.

As described herein, mobile device 210 may perform certain operations in response to processing unit 505 executing software instructions contained in a computer-readable medium, such as memory 510. The software instructions may be read into memory 510 from another computer-readable medium or from another device via communication interface 520. The software instructions contained in memory 510 may cause processing unit 505 to perform processes described herein. Alternatively, hardwired circuitry may be used in place of or in combination with software instructions to implement processes described herein. Thus, implementations described herein are not limited to any specific combination of hardware circuitry and software.

Figure 6:
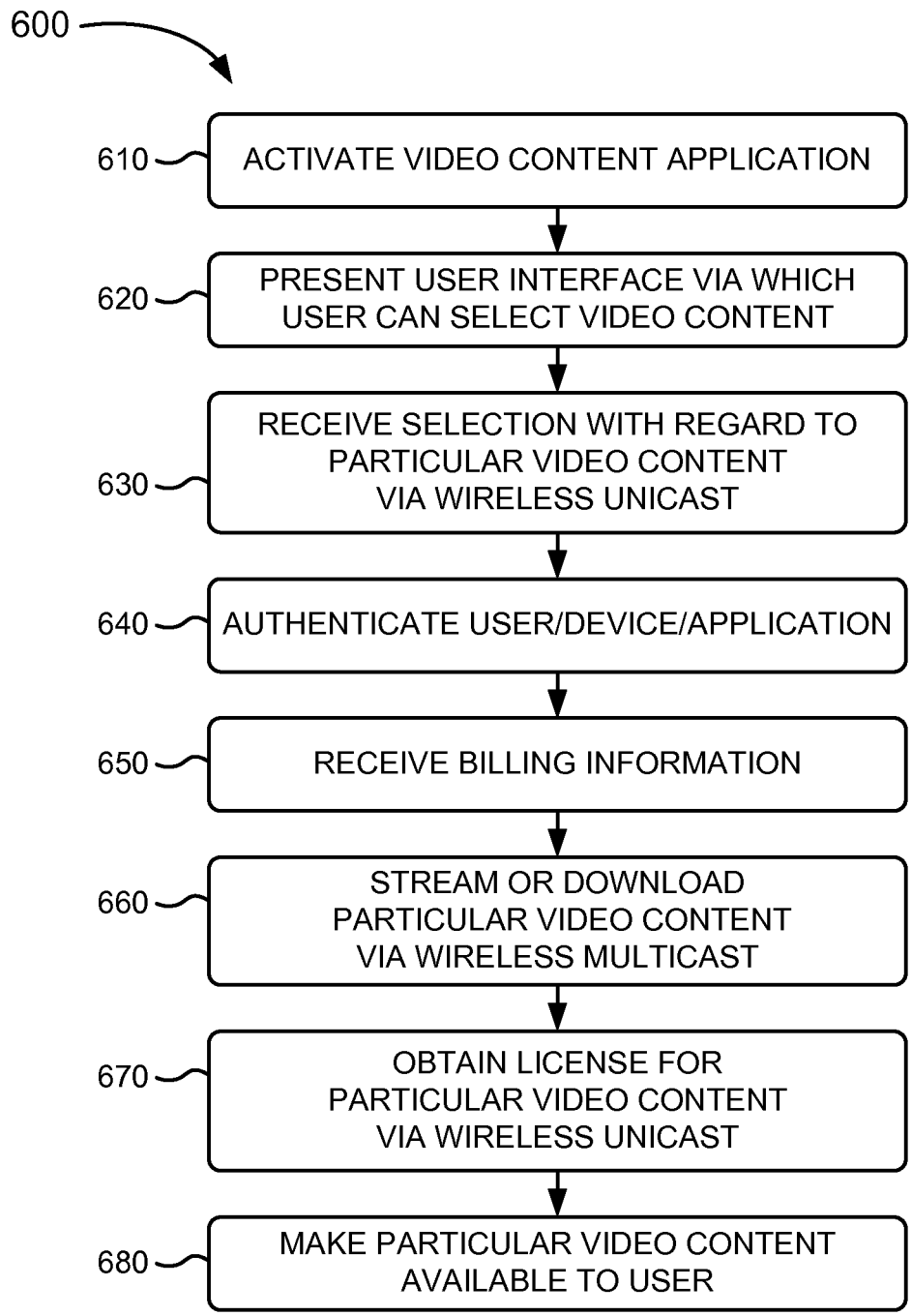
FIG. 6 is a flowchart of an example process for obtaining video content generally.

FIG. 6 is a flowchart of an example process 600 for obtaining video content. In one implementation, process 600 may be performed by one or more components of mobile device 210, such as processing unit 505 of mobile device 210. In another implementation, one or more blocks of process 600 may be performed by one or more components of another device (e.g., one or more of servers 220, 230, 240, 250, or 260), or a group of devices including or excluding mobile device 210. Process 600 will be described with corresponding references to example user interfaces illustrated in FIGS. 7-12.

Process 600 may include activating a video content application (block 610). For example, a user of mobile device 210 may activate a video content application in a standard manner, such as by selecting an icon (or another type of identifier) associated with the video content application, selecting the name of the video content application from a list, etc.

Process 600 may include presenting a user interface via which the user can select video content (block 620). For example, a user interface can provide images representing certain items available to a user of mobile device 210. In one implementation, the user may select a Video On Demand item through interaction with the user interface.

Figure 7:
FIG. 7 is a diagram of an example user interface via which video content can be selected according to an implementation.

FIG. 7 is a diagram of an example user interface 700 via which particular video content, such as Video On-Demand (VOD) content, may be selected. As illustrated in FIG. 7, the example user interface 700 may include a video listing selection bar 710, a video listing 720, an expanded video content description 730, and an interactive search field 740.

User interface 700 may be presented on a display of a mobile device 210 and can include interactive features allowing for selection of video content. For example, FIG. 7 illustrates user interface 700 on a display of a mobile tablet computer, which can be interacted with through a touch screen to select items associated with images displayed on the user interface 700. Other example user interfaces can include interaction through those input devices discussed above, including buttons 420, such as a standard telephone keypad, a QWERTY keyboard, or some other type or arrangement of keys or physical inputs.

Video listing selection bar 710 may be part of user interface 700 and may allow for selection of categories of video listings for browsing and navigation. For example, video listing selection bar 710 may provide options for listing including: all of the available Video on Demand options ("ALL"), the featured Video on Demand options ("FEATURED"), or the currently best selling Video on Demand options ("HOT").

Video listing 720 may be a list of the video content based upon the category selected from video listing selection bar 710. For example, upon selection of "FEATURED," a list of featured movies including "Alpha and Omega," "Vanishing on 7$^{th}$ Street," Dinner for Schmucks," "Case 39," and "Despicable Me" can be presented in video listing 720.

Expanded video content description 730 can allow for an expanded description of a selected video content. If more information about one of the video content from the video listing 720 is desired, then upon selection, an expanded video content description 730 can be displayed. For example, in FIG. 7, the "Synopsis" of "Alpha and Omega," including three lines of text and a link (e.g., "Bookmark") is shown for the expanded video content description, while only two lines of text are shown for the other video content in the video listing 720 (e.g., "Dinner for Schmucks," which only displays two lines of the "Synopsis").

Interactive search field 740 may be provided to allow for video content to be searched by names, keywords, titles, etc. rather than by selecting from categories listed in video listing selection bar 710. For example, if a movie starring Justin Long was desired, video listing 720 would include the available video content starring Justin Long.

Figure 8:
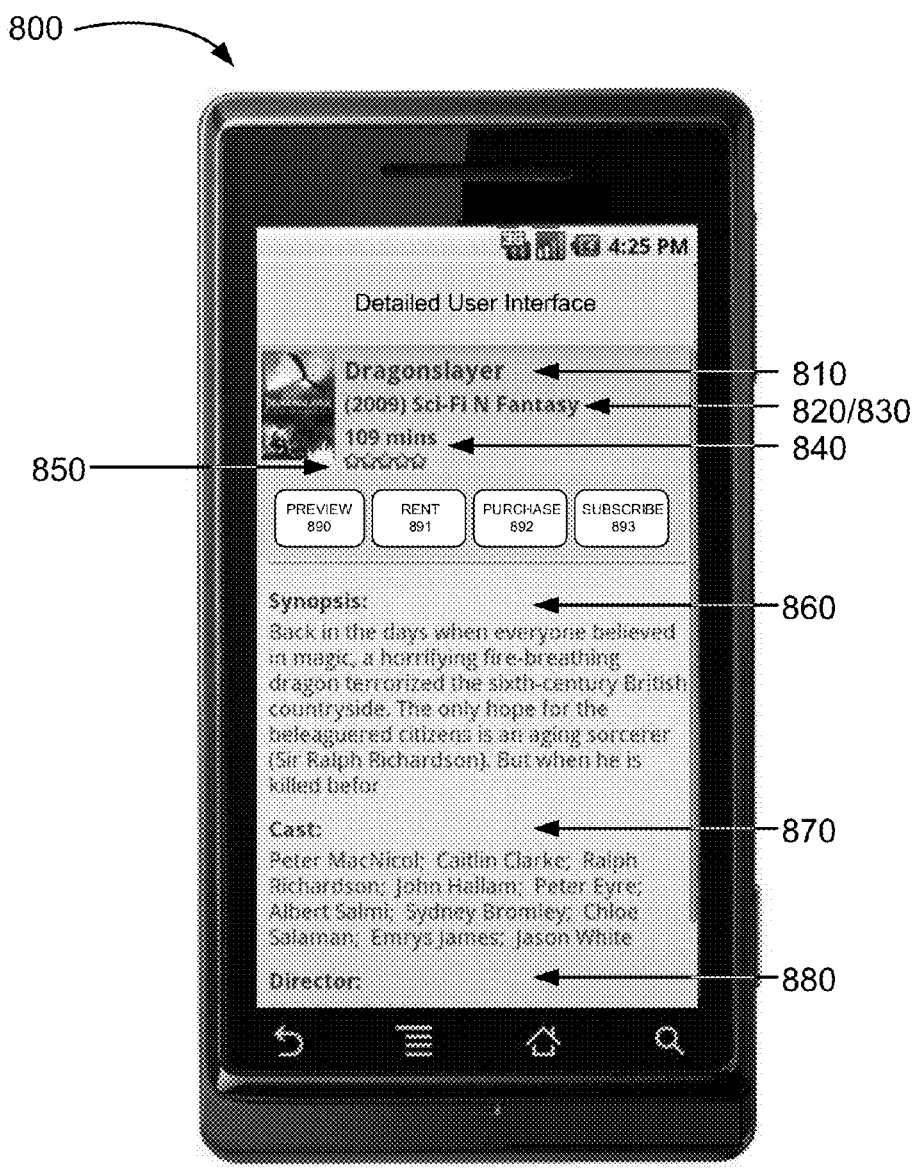
FIG. 8 is a diagram of an example user interface that may be presented for selection and purchase of video content according to an implementation.

After selecting one of the video listings 720, a detailed user interface may be provided with further information. For example, FIG. 8 is a diagram of an example detailed user interface 800 that may be presented for selection of a particular video content. The detailed user interface 800 may include detailed information regarding the particular video content and options for acting upon the particular video content. The detailed information might include information, such as a title 810 of the particular video content, a release date 820 of the particular video content (e.g., a year that the particular video content was released), a category 830 of the particular video content (e.g., a list of one or more categories assigned to the particular video content), a length of time 840 of the particular video content (e.g., a running length of the particular video content), a rating 850 of the particular video content, a synopsis 860 of the particular video content, a cast list 870 for the particular video content, a director list 880 for the particular video content, or the like.

The detailed user interface 800 may also present the user with options in relation to the particular video content. For example, the options might include an option to preview 890, an option to rent 891, an option to purchase 892, and an option to subscribe to a service 893.

Option to preview 890, when selected, may cause a trailer, or the like, to be played for the user. Option to rent 891, when selected, may permit the user to access the particular video content for a particular rental period or number of allowed accesses, after which the user may no longer be permitted to access the particular video content. Option to purchase 892, when selected, may permit the user to own the particular video content. Option to subscribe to a service 893, when selected, may permit the user to subscribe to a service via which the particular video content is available. For example, the service relating to the particular video content may correspond to a pay service, such as HBO, Cinemax, Starz, the Howard Stern channel, the NFL RedZone channel, or the like. Once the user subscribes to the service, the particular video content may be available to the user for the subscription period or until the user terminates the subscription.

Selection of video content can occur from the detailed user interface 800, where a user can select video content through a standard way, such as by selecting an icon or field. For example, in conjunction with example user interface 800, a user can press on one of the icons, such as the "PREVIEW," "RENT," "PURCHASE," or "SUBSCRIBE," to select the video content from the detailed user interface 800.

Assume, for this example, that the user has selected the rent, purchase, or subscribe option. Upon selection of rent, purchase, or subscribe, process 600 may include receiving the selection with regard to particular video content via wireless unicast (block 630). In other words, the mobile device 210 may have a one-to-one communication via wireless unicast signals 215A to transmit the selection with regard to the particular video content via wireless unicast for receiving by a server. By using wireless unicast system 215 for transmitting the selection, information about the user, device, or application can be transmitted along with the selection such that the app server 220 can identify the user, device, or application. For example, the selection of the particular video content can be transmitted via wireless unicast system 215 along with an identification of the device.

Figure 9:
FIGS. 9 and 10 are diagrams of example user interfaces for user interaction for identification and billing implementations.

Process 600 may include authenticating the user, device, or application (block 640). For example, the video content application may interact with app server 220 to authenticate the user, mobile device 210, or the video content application. For example, the video content application may solicit user login information (e.g., a user identifier (username) and password) from the user, as shown in FIG. 9. The video content application may provide the user login information to app server 220. App server 220 may compare the user login information to information maintained by user profile server 230 and may authenticate the user when the information matches.

Additionally, or alternatively, the video content application may provide device information (e.g., a mobile device identifier) to app server 220. App server 220 may compare the device information to information maintained by user profile server 230 and may authenticate mobile device 210 when the information matches.

Additionally, or alternatively, the video content application may provide application information (e.g., an identifier associated with the video content application) to app server 220. App server 220 may compare the application information to information maintained by user profile server 230 and may authenticate the video content application when the information matches.

Figure 10:
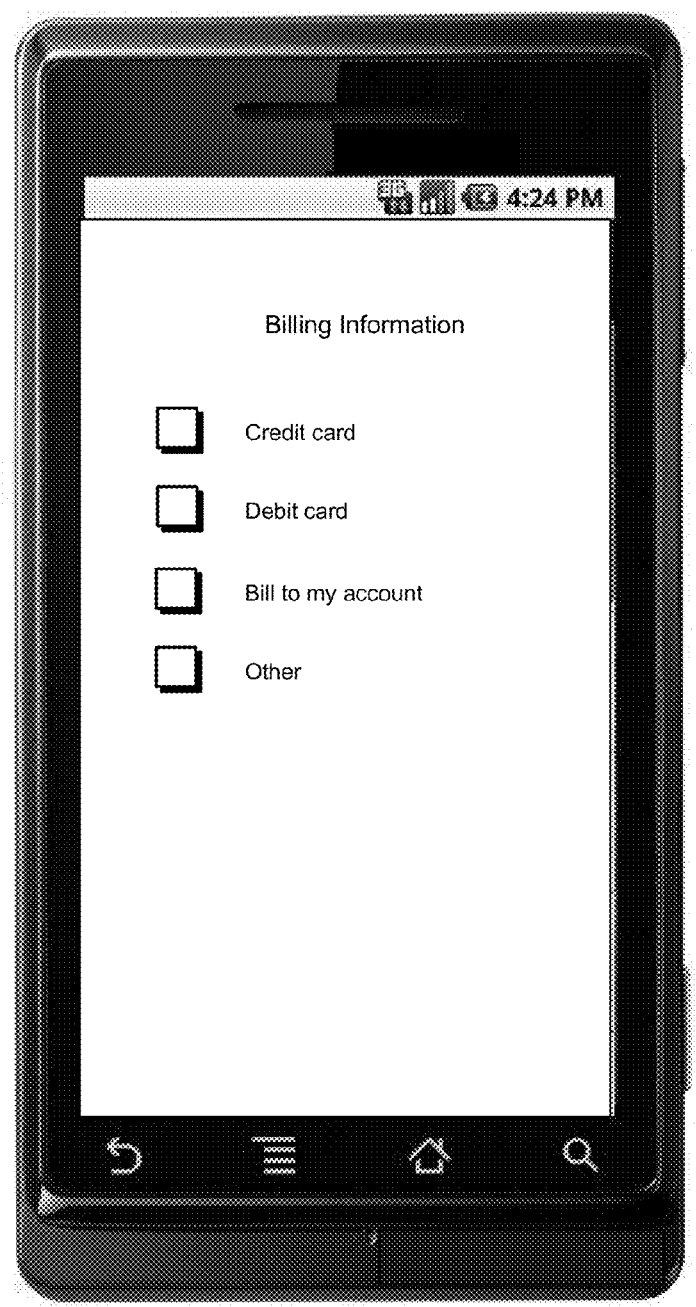

Process 600 may include receiving billing information (block 650). For example, the video content application may solicit the user to provide billing information, as shown in FIG. 10. In one implementation, the user may provide credit or debit card information. In another implementation, the user may be permitted to simply add the expense (for the rental, purchase, or subscription) to the user's account with that service provider. In yet another implementation, the user may be permitted to use "other" forms of service, such as a payment service, like PayPal.

Process 600 may include downloading or streaming particular video content via wireless multicast (block 660). Using wireless multicast system 205, video content can be simultaneously multicast using transmissions of multicast signals 205A to multiple users. Additionally, through wireless unicast transmissions of unicast signals 215A, the authentication can be separately provided, as discussed above, which, in conjunction with multicast, can allow for encrypted video content to be multicast by wireless multicast system 205 and a decryption key to decrypt the encrypted video content to be unicast by wireless unicast system 215. By using multicast for the data packets associated with the video content, wireless multicast system 205 can efficiently utilize a bandwidth of one or more channels to serve multiple mobile devices 210 for the length of a particular video content, while wireless unicast system 215 can utilize a bandwidth of one or more channels to serve multiple mobile devices 210 for shorter transactions, such as authentication of a user and licensing of the particular video content.

The video content application may follow the link and interact with content distribution server 260 to stream or download the particular video content. Content distribution server 260 may communicate with content storage server 250 to obtain the particular video content, in encrypted form, that may then be delivered to mobile device 210 via wireless multicast system 205. Content distribution server 260 or content storage server 250 may communicate with license server 240 to obtain a license identifier corresponding to a license associated with the particular video content. Content distribution server 260 may provide the particular video content (via wireless multicast system 205 to a mobile device 210) and the license identifier separately (via wireless unicast system 215). Mobile device 210 may display the streamed video content or may store the downloaded video content, and possibly the license identifier, in a memory associated with mobile device 210 (e.g., memory 510).

Figure 11:
FIGS. 11 and 12 are diagrams of example user interfaces for user interaction for streaming or downloading according to implementations.

FIG. 11 is a diagram of an example user interface 1100 with options via which selection between download and stream can be made. For example, a user can select icon "Download" or "Stream" to view video content via the mobile cache ("Download") at a later time or via the wireless multicast directly ("Stream") which would be available for immediate viewing.

Figure 12:
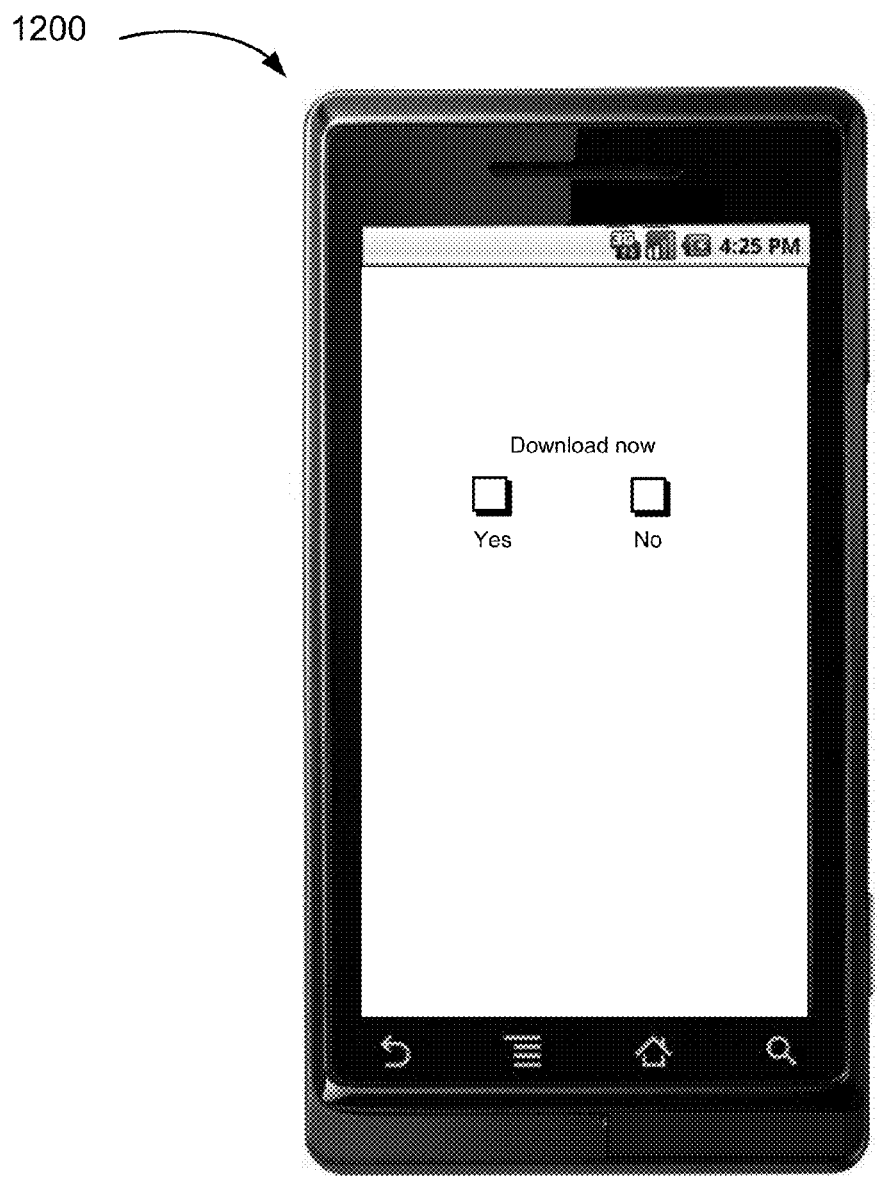

FIG. 12 is a diagram of an example user interface 1200 that may be provided to allow for immediate or delayed download of video content. For example, if "Yes" is selected for "Download now," then download can begin as soon as the wireless multicast system 205 multicasts the video content. Alternatively, if "No" is selected for "Download now," then download can be delayed until a more convenient time or situation, such as when there may be more available bandwidth or when the mobile device is not being used.

Returning to FIG. 6, process 600 may include obtaining a license for the particular video content via wireless unicast (block 670). For example, the video content application may interact with license server 240, in a secure manner, to obtain a license for the particular video content via wireless unicast system 215. In one implementation, the video content application may transmit the license identifier, to license server 240, to identify the particular license that is desired. License server 240 may interact with app server 220 to identify the particular video content for which there has been a purchase, rental, subscription, and to receive user profile information associated with the user of mobile device 210. License server 240 may also interact with the video content application to authenticate the user, device, or application in a manner similar to that described above with regard to block 640. In one implementation, license server 240 may use digital rights management techniques to control access, via a license, to the particular video content. The license may include information regarding use of the particular video content by the user (e.g., whether the user has permanent use (via a purchase) or temporary use (via a rental or subscription)), and a decryption key to permit the encrypted particular video content to be decrypted by mobile device 210.

Process 600 may include making the particular video content available to the user (block 680). For example, the video content application may use the decryption key (included in/with the license from license server 240) to decrypt the encrypted particular video content. The video content application may then notify the user that the particular video content is available for viewing whenever the user desires.

Figure 13:
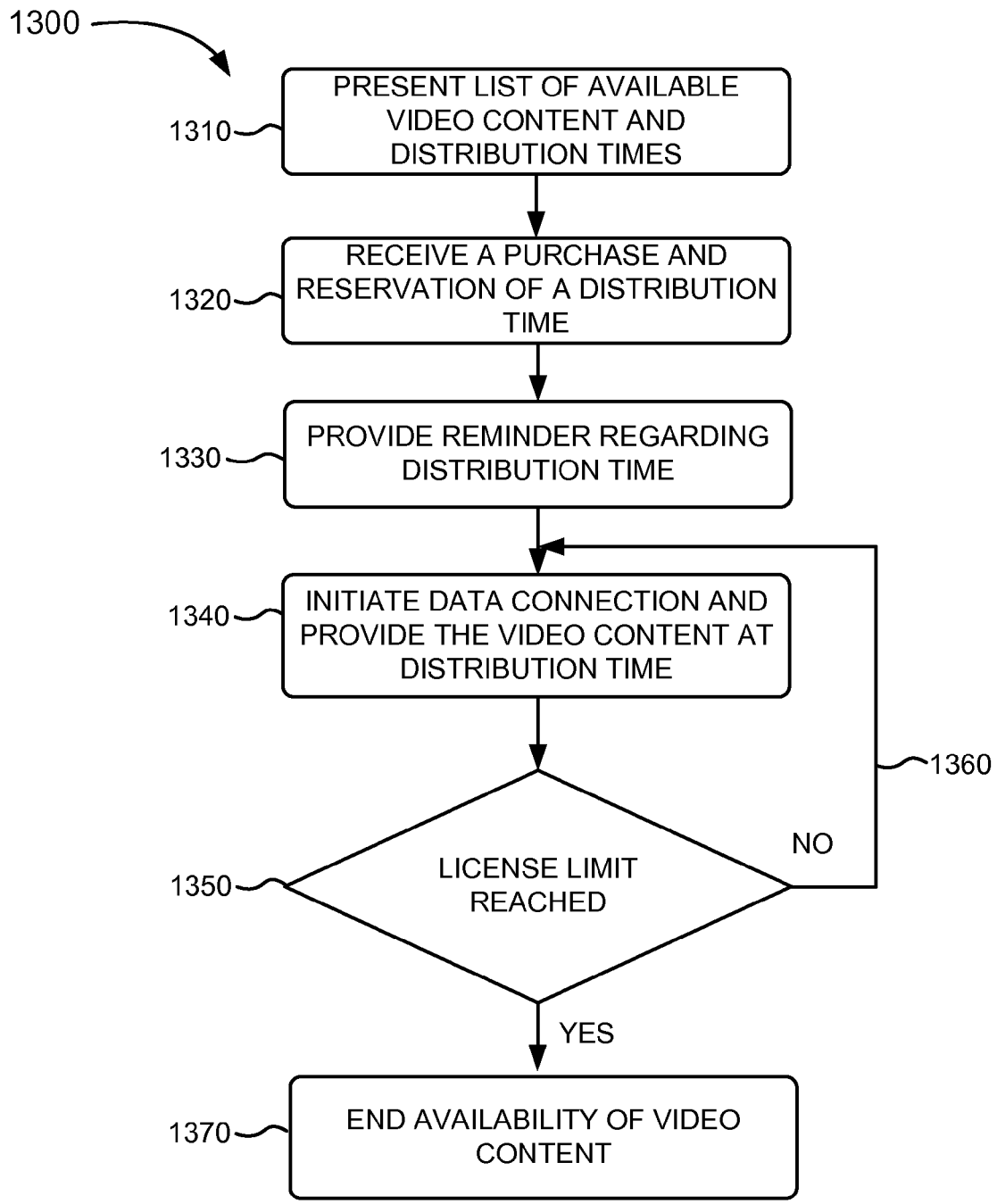
FIG. 13 is a flowchart of an example process for streaming video content according to an implementation.

FIG. 13 is a flowchart of an example process 1300 of streaming video content using a wireless multicast system 205 for video content distribution based on set streaming distribution times. In one implementation, process 1300 may be performed by one or more components of mobile device 210, such as processing unit 505 of mobile device 210. In another implementation, one or more blocks of process 1300 may be performed by one or more components of another device (e.g., app server 220 or user profile server 230), or a group of devices including or excluding mobile device 210.

Figure 14:
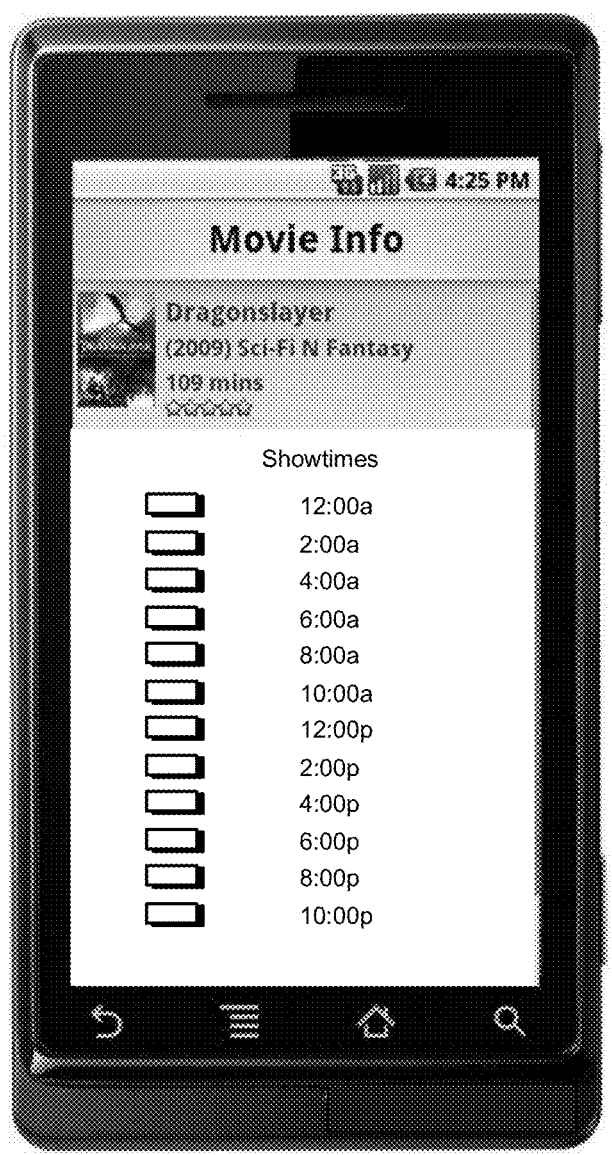
FIG. 14 is a diagram of an example user interface with set distribution times that may be implemented.

Process 1300 may include presenting a list of available video content and set distribution times (block 1310). In one implementation, a single multicast channel can be used to multicast a single video content. As illustrated in FIG. 14, example set distribution times can be displayed similar to show times at a movie theater. For example, the set distribution times can be spaced to allow one showing to end before the next one begins, where if a set distribution time of 2:00 p.m. was selected and the video content was 109 minutes, then on a single multicast channel the next set distribution time would be at least 109 minutes later, such as at 4:00, as illustrated in FIG. 14. The set distribution times can be scheduled throughout the day in a similar manner by starting set distribution times every 2 hours, as illustrated in FIG. 14.

Figure 15:
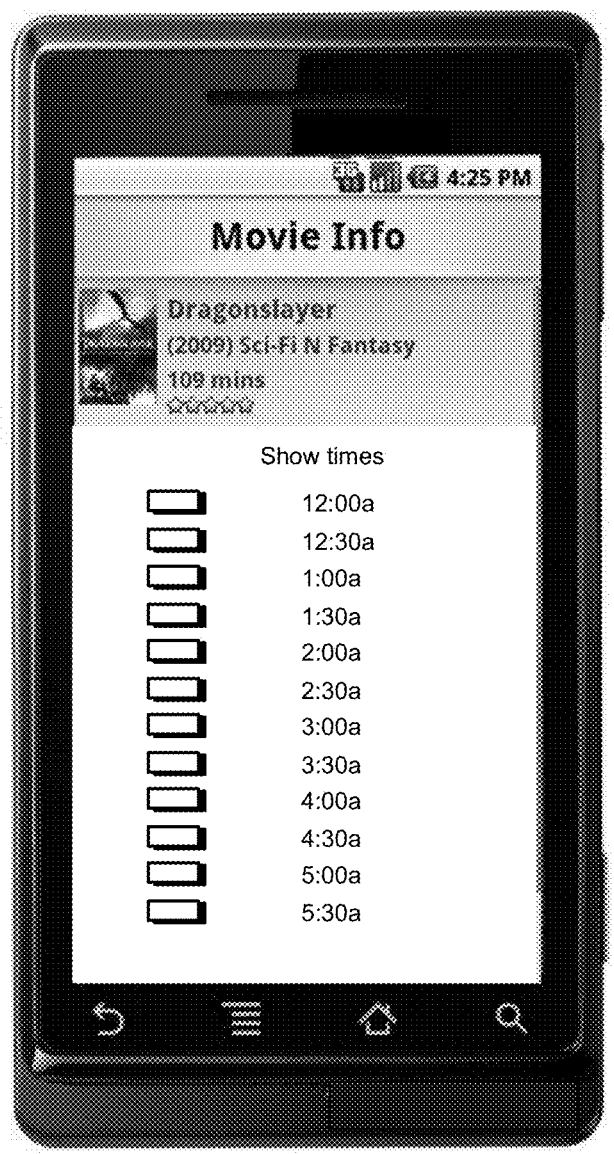
FIG. 15 illustrates an example user interface of video content using multicast distribution with overlapping distribution times according to an implementation.

In another implementation, more than one multicast channel can be used to multicast video content. For example, as illustrated in FIG. 15, at least four multicast data channels can be used to multicast different distribution times for "Dragonslayer" because each channel would be used for almost two hours, so four different multicast channels could be used to show, for example, the 12:00 a, 12:30 a, 1:00 a, and 1:30 a showings before the multicast channel showing the 12:00 a show time channel would be able to provide its next showing. By using multiple multicast channels, the video content could be distributed more frequently.

Process 1300 may include receiving a purchase and reservation of a distribution time (block 1320). For example, a purchase of a distribution time can include purchasing a license and decryption key for the video content; and a reservation of a distribution time can include an allocation for the multicast bandwidth at the reserved distribution time. In one implementation, a user of mobile device 210 can purchase and reserve a distribution time via a user interface, where a license and decryption key can be retrieved at the time of purchase, such that the license will be in place prior to the distribution time. In one implementation, the mobile device 210 can get a license and store the video content's URL for streaming.

Figure 16:
FIG. 16 illustrates and example user interface of a reminder for a set distribution time according to an implementation.
Figure 17:
FIG. 17 illustrates an example user interface of a countdown clock between distribution times according to an implementation.

Process 1300 may include providing a reminder regarding the distribution time (block 1330). By providing a reminder, the user of the mobile device 210 does not need to remember or set their own reminder for the distribution time. In one implementation, as illustrated in FIG. 16, a reminder can be set to appear as pop up reminders. For example, a visual and/or audio reminder can appear for specific time periods (e.g., 5 minutes, 2 minutes, and 1 minute) prior to the reserved distribution time, as illustrated in FIG. 16, or a text message via a SMS type notification from the app server 220 can be used as a reminder. In another implementation, as illustrated in FIG. 17, a reminder can include a countdown clock showing the amount of time remaining until the next distribution time, where the countdown clock can be displayed on the mobile device 210 until the video content begins. For example, as illustrated in FIG. 17, a countdown clock showing that the next show will be at 2:00 p and will start in 3:27 (i.e., 3 minutes and 27 seconds). The countdown clock and the reminder in FIG. 16 can be used interchangeably.

Process 1300 may include initiating a data connection and providing video content at distribution time (block 1340). For example, in one implementation, mobile device 210 can initiate a data connection using the multicast data channel information and a content Uniform Resource Locator (URL). Data delivery protocol can be Real Time Streaming Protocol (RTSP) or HTTP Live Streaming (HLS) depending on the implementation. The video content can be streamed at distribution time by transmitting right at distribution time or can begin transmitting before distribution time to create a buffer at mobile device 210. Mobile device 210 can receive the video content and present the video content for display at the distribution time.

Process 1300 may include limiting video content availability to a predetermined number of views or a predetermined time period for a license (block 1350), where if the limit is not reached, the video content continues to be available (block 1360). In one implementation, a license can limit the availability of video content to a predetermined number of views, where the number of views can be counted per completed viewing. For example, if a single view is allowed for a license, then video content can be viewed from start to finish (block 1350—YES) or can be started, stopped, and restarted (block 1350—NO) as many times as necessary to complete the allowed viewings (block 1350—YES). Example reasons for stopping may include situations such as when an operation that uses the communication channel (e.g., when the user uses mobile device 210 for a telephone call, to access the Internet, to make a data transfer, etc.) conflicts with the streaming of the video content, then the streaming may be disrupted and restarted; or if it is inconvenient to complete the video content due to scheduling conflicts or other reasons.

In another implementation, video content can be viewed for a predetermined time period. For example, if video content is rented for 24 hours, the video content can be viewed at any time within that 24 hour window and if a reserved distribution time is missed, video content is stopped before completion for any reason, or a second viewing is desired, then the data connection can be re-initiated and the video content provided again (block 1340) until the 24 hour window has completed (block 1350—NO).

Process 1300 may include ending the availability of video content (block 1370). In one implementation, the decryption key or access link can be expired, so that the video content would be inaccessible. For example, if an access link was provided upon purchase of the distribution time, then the access link can be made invalid when accessed and video content would not be available.

Figure 18:
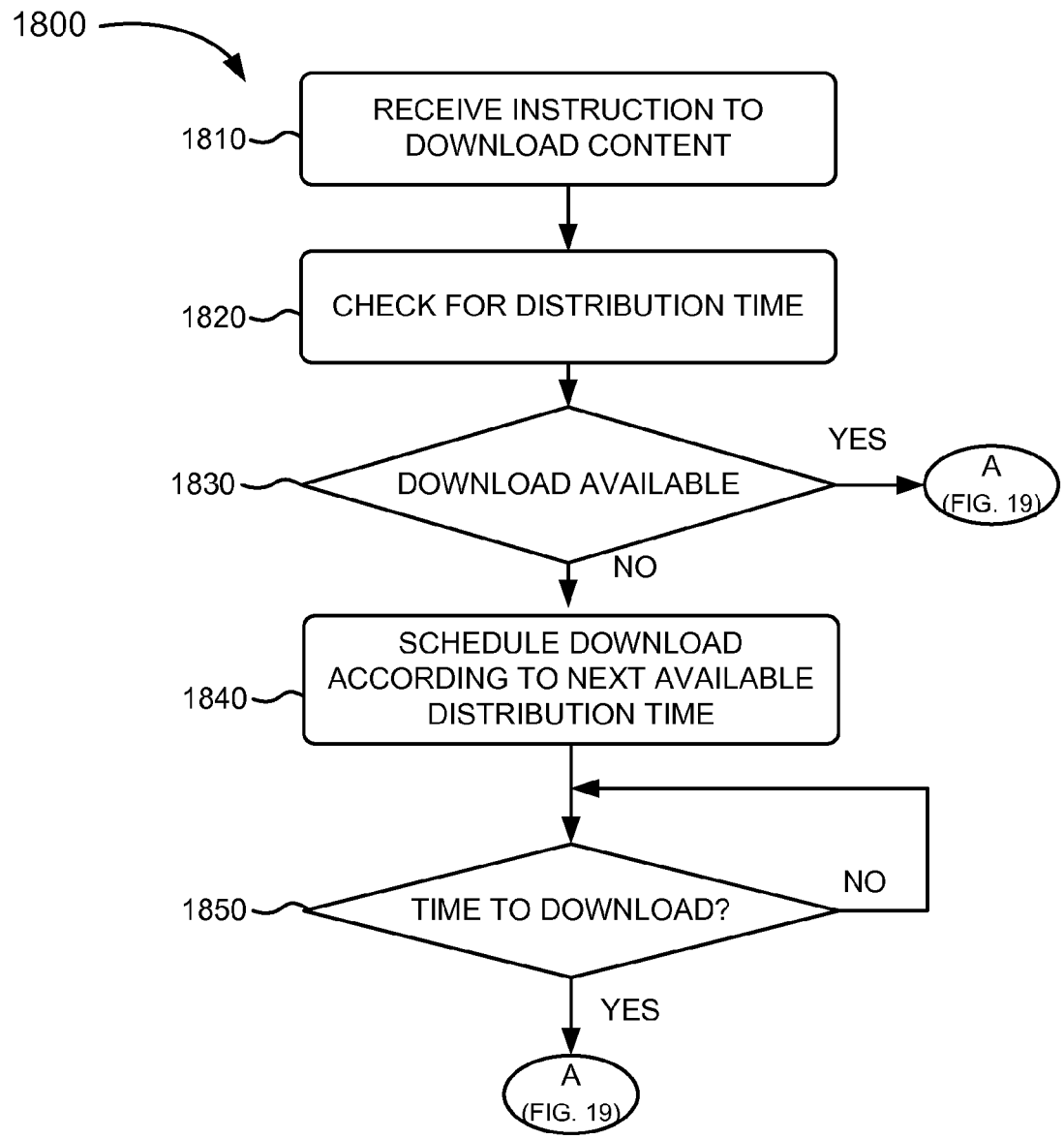
FIGS. 18 and 19 illustrate an example process of downloading video content using wireless multicast according to an implementation.
Figure 19:
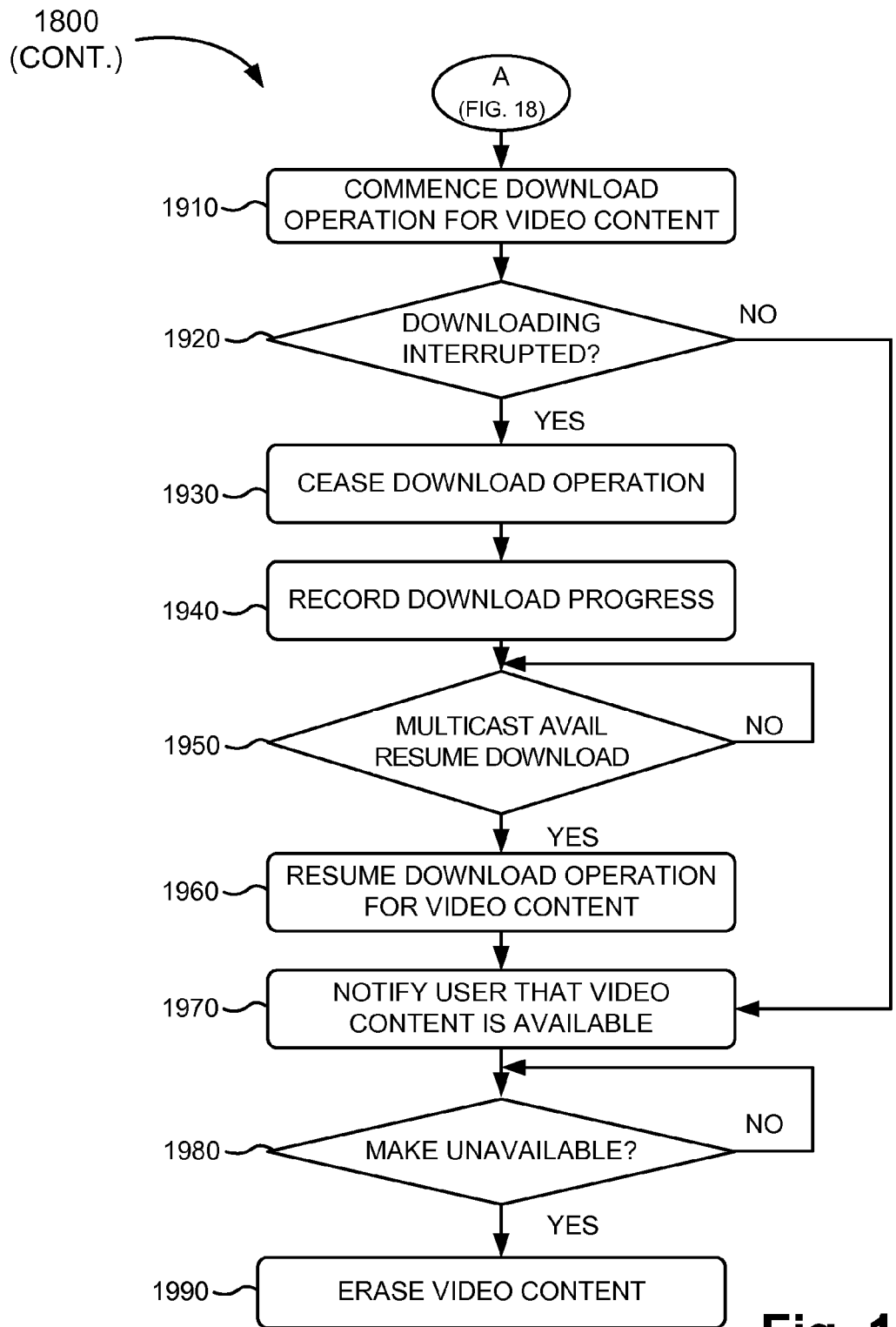

FIGS. 18 and 19 illustrate a flowchart of an example process 1800 for downloading video content using wireless multicast system 205. In one implementation, process 1800 may be performed by one or more components of mobile device 210, such as processing unit 505 of mobile device 210. In another implementation, one or more blocks of process 1800 may be performed by one or more components of another device (e.g., content distribution server 260), or a group of devices including or excluding mobile device 210. In another implementation, one or more blocks of process 1800 may be performed by a download manager. Mobile device 210 may include a download manager, which may be implemented as a combination of hardware and software based on the components illustrated and described with respect to FIG. 5. Alternatively, a download manager may be implemented as hardware based on the components illustrated and described with respect to FIG. 5. A download manager may manage a download operation and may communicate with content distribution server 260 to obtain video content through wireless multicast system 205.

Process 1800 may include receiving an instruction to download video content (block 1810). As described above with regard to FIG. 11, a user may select to stream or download content (see also block 660 in FIG. 6). For example, mobile device 210 may receive an instruction to download video content from a user interacting with a user interface on mobile device 210.

Process 1800 may include checking when a distribution time is set (block 1820). For example, a mobile network may have a multicast of the desired video content being multicast immediately or there may be a wait depending on how many multicast channels are multicasting the video content and the frequency at which the multicasts are being provided. In one implementation, a single multicast channel can be assigned to the video content and downloads can occur using the single multicast channel. For example, if a video content required about an hour for download, then the video content could be offered for download every hour.

Additionally, or alternatively, several multicast channels can be assigned to the video content. In one implementation, several multicast channels can be multicast in an overlapping manner to reduce the amount of time between downloading opportunities. For example, if a video content required about an hour for download, then two multicast channels could be used to offer downloading every half hour, or four multicast channels could be used to offer downloading every 15 minutes.

Additionally, or alternatively, several multicast channels can be multicast simultaneously to reduce the amount of time required for download. For example, if a video content requires an hour to download on a single multicast channel, then 6 multicast channels can be dedicated to the download, and the video content could be downloaded in around $\frac{1}{6}^{th}$ of the time e.g., about 10 minutes), and a schedule of multicast times can reflect this faster download. Additionally, or alternatively, during low network demand times (e.g., overnight, weekends, holidays, etc.), several multicast channels that may be assigned to other network uses during high demand times can be re-assigned to video content downloading to reduce the amount of time between downloading opportunities or to reduce the amount of time required for download. For example,—mobile device 210 can work with app server 220 to schedule multicast download during night hours when network usage may tend to be lower for popular shows or news. By scheduling multicast downloads during night hours, not only can downloading be faster, the content can also be available for viewing the next morning.

Process 1800 may include determining whether a download time is available (block 1830). For example, the network in which the multicasts are being provided may have the capacity limit to provide multicast to 100 users, so if reservations for 100 users has already been filled, then the multicast time would not be available to allow for additional users beyond the 100 to download the video content at that download time.

When the video content cannot be downloaded immediately (block 1830—NO), then the process 1800 may include scheduling the video content download for the next available scheduled distribution time (block 1840). For example, if the distribution times are set to be every hour on the hour and it is 1 pm, the next scheduled multicast could begin at 1 pm and if available, then download could begin at 1 pm; however, if the 1 pm slot is not available, then download could begin at 2 pm if the multicast slot is available.

Process 1800 may include monitoring whether it is time to download the video content (block 1850). For example, a download manager may be used to monitor conditions to determine when it is time to commence the download operation. If it is not currently time to commence the download operation (block 1850—NO), then the download manager may continue to monitor conditions until it is time to commence the download operation (block 1850—YES). For example, download manager may communicate with content distribution server 260 to commence download operation and download the video content.

Process 1800 continues on FIG. 19 and may include commencing video download operations (block 1910). In one implementation, communication between download manager and content distribution server 260 may conform to FTP. Download manager may store the downloaded video content in a memory, such as memory 510.

Process 1800 may include determining that downloading is interrupted (block 1920—YES). For example, downloading may be interrupted when mobile device 210 commences an operation that uses the communication channel (e.g., when the user uses mobile device 210 for a telephone call, to access the Internet, to make a data transfer, etc.) that interrupts the reception of the multicast signal 205A.

Process 1800 may include ceasing the download operation (block 1930). For example, ceasing downloading may be caused by an interruption of the downloading operation (in block 1920), such as loss of communication channel or user cancelling or delaying downloading.

Process 1800 may include recording the download progress (block 1940). For example, download manager may monitor the progress of the download operation and, when the download operation is ceased, download manager may record the progress to begin downloading from the same downloading position when the download operation resumes. Download manager may also store the portion of the video content that had been received prior to the interruption.

Process 1800 may include checking multicast availability status (block 1950) to determine whether multicast signals 205A are available for resuming download. Once the download operation has ceased (due to interruption of the download operation), download manager may monitor conditions to determine when to resume the download operation. If it is not currently time to resume the download operation because, for example, perhaps the interruption is still interrupting the download (block 1950—NO), then download manager may continue to monitor conditions until it is time to resume the download operation (block 1950—YES).

Process 1800 may include resuming the download operation for video content (block 1960). For example, download manager may communicate with content distribution server 260 to resume the downloading of the video content.

Process 1800 may include notifying the user that the video content is available (block 1970). For example, download manager may present a visual notification on display 425 or an audible notification via speaker 415 to notify the user that the video content is available.

Process 1800 may include making the video content unavailable (block 1980). For example, if a single use license was purchased, and viewing of the video content has been completed, then the video content may be determined to be expired.

Process 1800 may include erasing the video content (block 1990). For example, if the video content was rented for 24 hours, then after 24 hours, the video content can be erased or removed from the memory of the mobile device 210.

The foregoing description provides illustration and description, but is not intended to be exhaustive or to limit the implementation to the precise form disclosed. Modifications and variations are possible in light of the above teachings or may be acquired from practice of the implementations.

For example, while series of blocks have been described with respect to FIGS. 6, 13, 18 and 19, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the implementations. Thus, the operation and behavior of these aspects were described without reference to the specific software code—it being understood that software and control hardware can be designed to implement these aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving, by a processor of a mobile device, an instruction to download or stream particular content;
    sending, by the processor of the mobile device, a first wireless unicast signal requesting the particular content at a first distribution time selected from a plurality of distribution times associated with the particular content;
    determining whether the particular content can be downloaded or streamed at the first selected distribution time;
    when it is determined that the particular content can be downloaded or streamed at the first selected distribution time, receiving the particular content, via a wireless multicast signal and by the processor of the mobile device at the first selected distribution time;
    when it is determined that the particular content cannot be downloaded or streamed at the first selected distribution time, receiving the particular content, via the wireless multicast signal and by the processor of the mobile device at a second one of the plurality of distribution times at which the particular content can be downloaded or streamed;
    obtaining, by the processor of the mobile device via a second wireless unicast signal, a license for the particular content; and
    providing, after obtaining the license, a notification that the particular content is available for display by the mobile device.

2. The method of claim 1, further comprising:
    determining that whether the particular content can be downloaded or streamed at the first or second distribution times based upon:
    a time of a request for the particular content,
    an availability of network capacity for streaming or downloading the particular content at the first or second distribution times, and an availability of a license for streaming or downloading the particular content at the first or second distribution times.

3. The method of claim 1, where receiving the instruction to download or stream the particular content includes:
presenting, via a display associated with the mobile device, a user interface to permit a user to select the particular content from a plurality of content, and
receiving, from the user and via the user interface, selection of the particular content.

4. The method of claim 1, where the particular content is encrypted, and the license includes a decryption key, and
where the method further comprises decrypting the particular content using the decryption key.

5. The method of claim 1, further comprising:
determining whether the particular content cannot be streamed or downloaded at a requested time;
providing a user with an option to stream or download the particular content at alternative times at which the particular content can be streamed or downloaded, when it is determined the particular content cannot be streamed or downloaded at the requested time;
receiving, from the user, a selection of one of the alternative times; and
receiving the particular content at the selected one of the alternative times.

6. The method of claim 1, further comprising:
identifying an interruption of the streaming or downloading the particular content when only a portion of the particular content has been received, where the portion is less than an entirety of the particular content;
ceasing the streaming or downloading of the particular content in response to the interruption;
storing the portion of the particular content when the interruption of the downloading is identified;
recording information regarding a progress of the streaming or downloading of the particular content at a time of ceasing the streaming or downloading; and
resuming the streaming or downloading of the particular content based on at least one of the portion or the recorded information.

7. The method of claim 1, where providing the notification that the particular content is available includes:
presenting a visual notification via a display associated with the mobile device, or
presenting an audible notification via a speaker associated with the mobile device.

8. The method of claim 1, further comprising:
authenticating a user, the mobile device, or an application residing on the mobile device prior to permitting the particular content to be received by the mobile device.

9. The method of claim 8, where authenticating the user, the mobile device, or the application includes at least one of:
receiving login information associated with the user, and comparing the login information with stored information to authenticate the user,
receiving device information associated with the mobile device, and comparing the device information with stored information to authenticate the mobile device, or
receiving application information associated with the application, and comparing the application information with stored information to authenticate the application.

10. The method of claim 1, where the first wireless unicast signal, the wireless multicast signal, or the second wireless unicast signal is sent between one or more servers and the mobile device.

11. A system, comprising:
one or more servers to:
receive, via a first wireless unicast signal and from a mobile device, an instruction to transmit particular video content at a first distribution time selected from a plurality of distribution times;
determine whether the particular video content can be transmitted at the first distribution time;
transmit, via a wireless multicast signal, data for the particular video content at the first distribution time when it is determined that the particular content can be transmitted at the first distribution time;
transmit, via the wireless multicast signal, data for the particular video content at another distribution time when it is determined that the particular content cannot be transmitted at the first distribution time; and
transmit, via a second wireless unicast signal, a license for the particular video content, where the license permits the particular video content to be viewed at the mobile device.

12. The system of claim 11, where the one or more servers include a first server, a second server, and a third server, where:
the first server is to receive, via the first wireless unicast signal, the instruction to transmit the particular video content;
the second server is to transmit, via the wireless multicast signal, data for the particular video content; and
the third server is to transmit, via the second wireless unicast signal, the license for the particular video content.

13. The system of claim 12, where the first server comprises an application server to receive the instruction to transmit particular video content and to transmit an application instruction to the second server.

14. The system of claim 13, where the second server comprises a content distribution server to receive the application instruction from the first server to transmit the data for the particular video content and transmits data for the particular video content.

15. The system of claim 12, where the third server comprises a licensing server, to receive an instruction from the first server to transmit the license for the particular video content.

16. A non-transitory computer-readable medium that stores instructions executable by a processor of a device, to perform a method, the method comprising:
receiving an instruction to download particular content;
transmitting, via a first wireless unicast signal from the processor of the device, the instruction to download the particular content;
receiving, by the processor of the device, a plurality of wireless multicast signals corresponding to the particular content, wherein the plurality of multicast signals are assigned from at least two multicast channels to increase a bandwidth of the download; and
generating, after receiving the particular content, a notification that the particular content is available to be accessed.

17. A mobile device, comprising:
a processor, connected to a memory, to:
receive, from a user, an instruction to obtain particular video content,
send, via a first wireless unicast signal from the processor, the instruction to obtain the particular video content at a first selected distribution time, receive the particular video content via a wireless multicast signal to the processor at the first selected distribution time of the particular content when it is determined that the particular content can be obtained at the first selected distribution time, receive the particular video content via the wireless multicast signal to the processor at another distribution time at which the particular content can be obtained when it is determined that the particular content cannot be obtained at the first distribution time;

obtain a license for the particular video content via a second wireless unicast signal, and make the particular video content available for access by the user after obtaining the license.

18. The mobile device of claim 17, where when receiving the instruction to obtain the particular content, the processor is further to:

present, via a display associated with the mobile device, a user interface via which the user can select the particular video content, where the user interface includes information regarding the particular video content including the distribution times of the particular content, and receive, from the user and via the user interface, an input defining whether to stream or download the particular video content.

19. The mobile device of claim 17, where the processor receives the particular video content via a wireless multicast signal to the processor by receiving downloading data for the particular video content from a multimedia broadcast service, via more than one wireless multicast channels assigned to the particular video content by the broadcast multicast service center.

20. The mobile device of claim 17, where the license includes information that defines a length of time that the particular video content is accessible by the user, and where, when making the particular video content available, the processor is to permit the user to access the particular video content for the length of time.

* * * * *